United States Patent [19]
Long

[11] 3,811,010
[45] May 14, 1974

[54] INTRUSION DETECTION APPARATUS

[75] Inventor: David T. Long, Oviedo, Fla.

[73] Assignee: The United States of America as represented by the Secretary of the Navy, Washington, D.C.

[22] Filed: Aug. 16, 1972

[21] Appl. No.: 281,080

[52] U.S. Cl. .......................... 178/6.8, 178/DIG. 38
[51] Int. Cl. .......................... H04n 7/18
[58] Field of Search .......................... 178/6.5, 6.8, DIG. 38

[56] References Cited

UNITED STATES PATENTS

| | | | |
|---|---|---|---|
| 3,697,675 | 10/1972 | Beard | 178/6.5 |
| 3,674,921 | 7/1972 | Goldsmith | 178/6.5 |
| 2,473,893 | 6/1949 | Lyle | 178/DIG. 38 |

*Primary Examiner*—Howard W. Britton
*Attorney, Agent, or Firm*—R. S. Sciascia; J. W. Pease

[57] ABSTRACT

Intrusion detection apparatus employing two spaced-apart TV cameras having lines of observation which intersect to form a three dimensional monitored locale of interest and a TV monitor having a display tube and connected to respond to output signals from said TV cameras. The cameras and monitors being synchronized to identify the presence and location of an intruder object in said locale of interest. In another aspect the invention comparator-adder analyzing circuitry is provided between the cameras and monitor such that the monitor is actuated only when the video from both cameras is identical at a given instant. Assuming each camera is directed to observe a different background and that the focus is adjusted to substantially eliminate background signals, then only signals from the intruder object are observed and it is observed only in the monitored locale.

8 Claims, 4 Drawing Figures

INTRUSION DETECTION APPARATUS

BACKGROUND OF THE INVENTION

The invention relates in general to the field of electrooptics and more specifically to the detection of an object in a monitored locale in space without developing false signals from objects outside the monitored locale.

In the past, various systems have been developed to monitor an area of interest to discover intruding objects or a change in attitude or position of an object. Such systems are useful as security guards, as indicators of malfunction in production lines by disorientation of a workpiece, and as detectors of projectiles fired as a target. Such systems include those which monitor a scene and are designed to detect any movement or variation of the scene. An example is the problem of detecting an enemy object emerging from a jungle background. In this case, if the enemy object is camouflaged this can cause errors because of the difficulty of distinguishing an object of interest from background information. In accordance with applicant's invention, this problem is eliminated by excluding the effect of background information on operation of the detection system. The subject system is also advantageous over prior art systems of the infra-red detection types in that it is less complex and more sensitive and accurate.

SUMMARY OF THE INVENTION

Applicant's invention departs from the prior art teaching of recognition of change in position or attitude of an object in a background scene and instead is designed to respond to identity of signal. In one aspect of the invention this is accomplished by providing two synchronized TV cameras to monitor a three dimensional locale and by utilizing comparator-adder analyzing circuitry to provide an output to a TV monitor only responsive to simultaneous identical signals received from said spaced TV cameras. One advantage of the subject invention over the prior art methods is that it rejects all objects in front of and behind the intrusion area and then accurately locates the intrusion object on the TV monitor. In another aspect of the invention two synchronized TV cameras are positioned to monitor a three dimensional locale, the video outputs of the cameras being passed to the monitor to produce dual images as the object passes through the depth of the locale and a single image when the object meets a mid-depth portion of the locale at which point the object is precisely located in depth and in relation to the width of the area monitored.

DESCRIPTION OF THE PREFERRED EMBODIMENT

Figure 1:
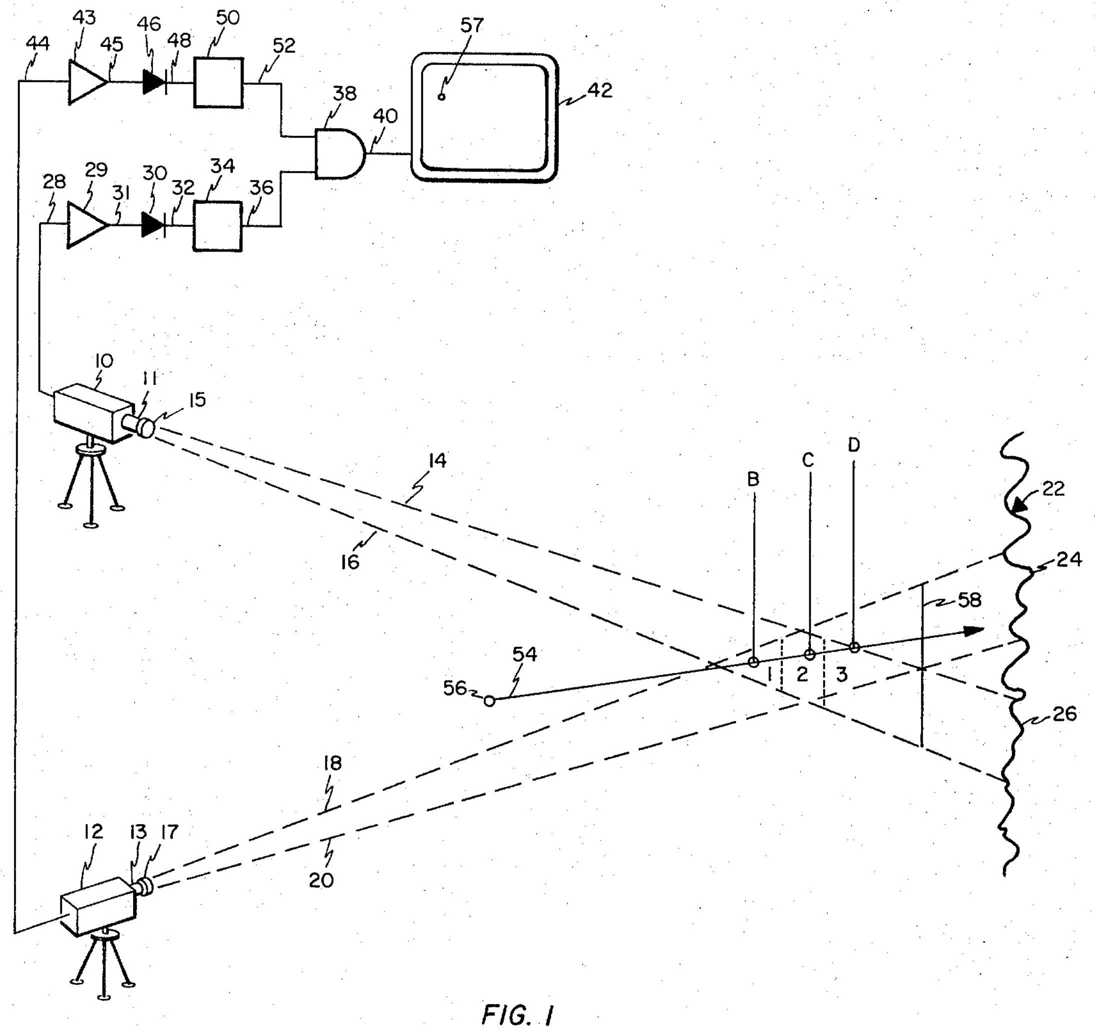
FIG. 1 is a diagrammatic illustration of an intrusion detecting apparatus embodying the invention.

Referring to the drawings FIG. 1 illustrates diagrammatically one arrangement of elements incorporating applicant's invention. In this arrangement a pair of television cameras 10 and 12 are positioned with fields of observation, indicated by dotted lines 14, 16, 17, and 20, to observe a three dimensional locale indicated by the sections 1, 2, and 3. A background scene is indicated generally at 22 and includes a portion 24 included between the lines of observation 18 – 20 of camera 12 and a portion 26 included between the lines of observation 14 – 16 of camera 10. In accordance with the apparatus of FIG. 1 it is an object of the invention to monitor as a locale of interest the Sector 2.

To monitor Sector 2 in accordance with the arrangement shown in FIG. 1 the video electrical signal output of camera 10 is connected by line 28, amplifier 29, line 31, diode 30, line 32, pulse width adjuster 34, line 36, AND gate 38 and line 40 to a TV monitor 42. The video electrical signal output of camera 12 is connected by line 44, amplifier 43, line 45, diode 46, line 48, pulse width adjuster 50, line 52, AND gate 38 and line 40 to the TV monitor 42. The cameras 10 and 12 and the monitor 42 are synchronized to each other for identical time scan. The dotted line 54 represents the path of an intrusion object 56.

In operation the system as per FIG. 1 is distinguished from prior art systems which detect changes in a scene before the television camera. It is different in that it rejects background signals and all signals of non-identity and indicates only scenes of identity in time scan. Considering FIG. 1 the background of each camera is different. The only locale where both cameras will see the same scene is where their views intersect. The signals from the cameras will only record and be reproduced on the monitor 42 when they are the same. When the signals from each camera are different they will be rejected at the interface equipment which may be any form of comparator-adder analyzing circuitry. In the present instance we have shown for simplicity a simple AND gate 38. When the scene and hence the output signal is the same such that it passes through the AND gate it will precisely locate and indicate an object when and at the point where it passes through the intrusion area. Curves A10 and A12 representing respectively the outputs of cameras 10 and 12 indicate the condition described above. Only points 60 and 62 are in identical time relation and represent the intrusion object. The remaining portions of each curve show signals not in time identity and representative of difference in background of the two cameras 10 and 12.

The invention as described above can be used as a security device to monitor a specific locale and provide information on the monitor as to when and exactly where the locale has been intruded. However, it also has an inherent factor which makes the invention particularly useful as a miss-distance indicator to detect projectiles being fired at a target such as target 58 in FIG. 1 which then replaces the background 22. In applicant's system as described for FIG. 1 the projectile on object 56 would not be detected until it passes through a specific target scoring position, i.e. the intrusion locale B, then the projectile is accurately located and shown on the TV monitor 42 as indicated by the dot 57. The system overcomes the problem of the television camera scanning a different portion of the target than where the projectile is located and thereby not producing a signal as it passed. The present system, using two synchronized television cameras, scans an area in depth, which is referred to herein as a locale. The projectile will be traveling through the thickness of the intrusion area long enough for the television cameras to scan the entire target position, thereby coming in contact with the projectile sometime while it is passing through the thickness of the intrusion area, hence through the locale. The thickness of the area is controlled by the spacing of the cameras, and the distance the cameras are from the monitored locale.

Figure 2:
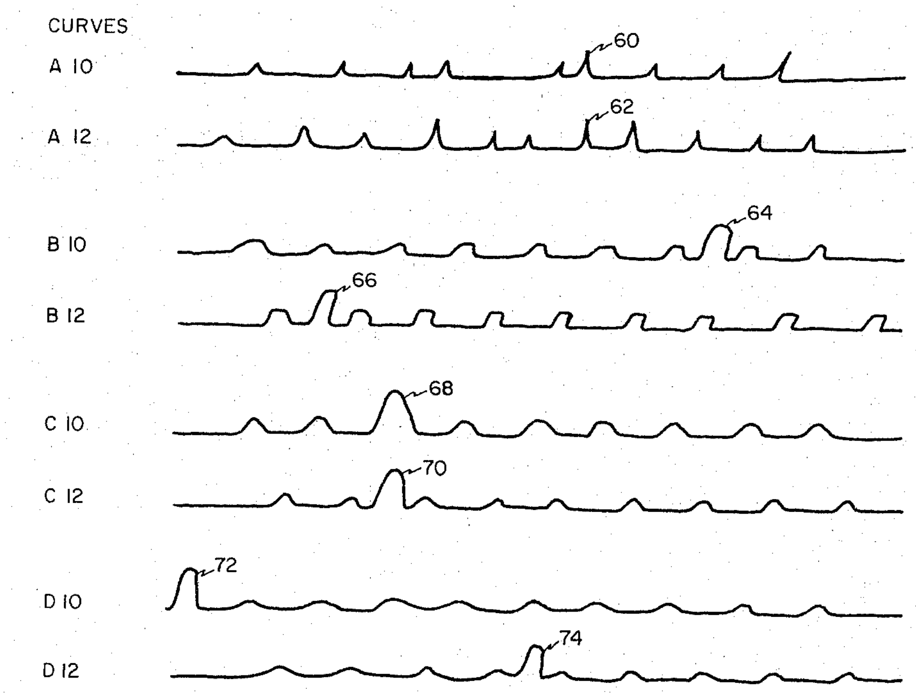
FIG. 2 is a set of curves used to explain the operation of the apparatus of FIG. 1.

In FIG. 2 curves B10–B12, C10–C12, and D10–D12 indicate respectively the outputs of cameras 10 and 12 for the three zones 1, 2, and 3 as a projectile passes through each zone. The several small amplitude pulses in each curve indicate background noise output. The one large amplitude pulse in each curve indicates the pulse originated by the projectile. Thus, at point B in the zone 1 camera 10 sees the projectile to the left of its screen as at 66. There is thus a time interval between pulses and no output is obtained from the AND gate 38. However, at point C, zone 2 the output pulses are identical in time as at 68 and 70 (curves C10 and C12) and hence a scene of precise location is indicated on the monitor 42 as at 57. Curves D10–D12 show the condition where the projectile is in the 3 zone at point D and again the output pulses 72 and 74 (curves D10 and D12) are of different times such that no output is obtained from AND gate 38.

Under those conditions where there may be sufficient identity of background areas such that false signals could result, the amplifiers 29 and 42 and the diodes 30 and 46 are useful as clipper circuits to eliminate the background noise and allow to pass only the strong signal of the intrusion object. It is also assumed that the cameras 10 and 12 are provided with the necessary focus heads 11 and 13 and filters 15 and 17 to properly adjust the cameras for the distance to the locale to be monitored. The pulse width adjusters 50 and 34 are utilized when necessary to overlap two pulses and present to the AND gate 38 the appearance of two pulses of identical time. This requirement depends upon the depth of the locale C and the scan rate of the two cameras. It is also possible that one may have two or more complete scans of locale C during passage of a projectile through it. In this case the pulse width adjusters may be required. Any device such as a simple Schmitz trigger may have its elements chosen to provide the required pulse width. It is understood then that there are applications where diodes or other means for eliminating background noise may be desirable and other applications where such are not necessary. The same is true of the pulse width adjuster means. It is also contemplated that the target 58 may be made of light absorbing means such as black colored material to eliminate possible coincidence background signals.

Thus far applicant's invention has been described in a form utilizing a comparator-adder analyzer to precisely locate, on a TV monitor screen, the exact location of an intrusion object in a three dimensional locale of interest being monitored.

Figure 3:
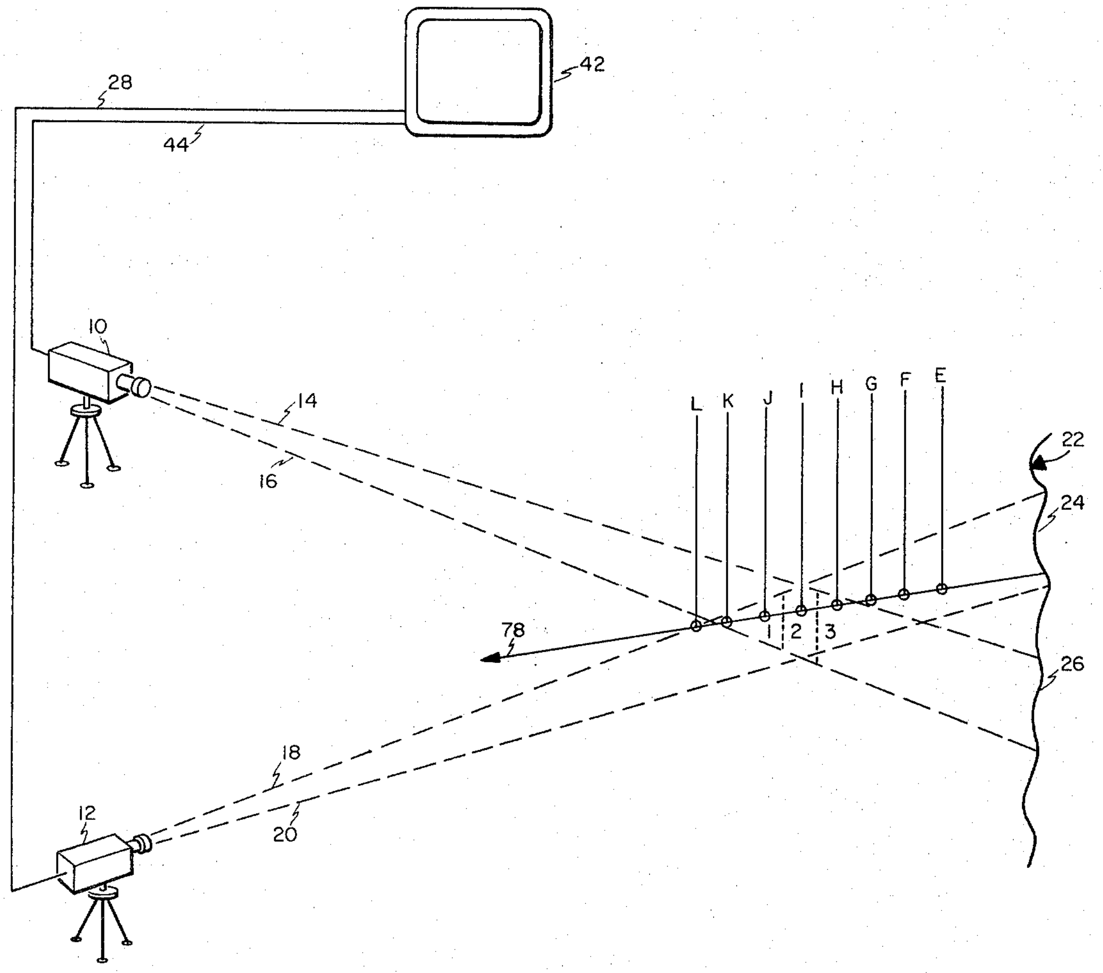
FIG. 3 is a diagrammatic illustration incorporating the invention in a modified form.
Figure 4:
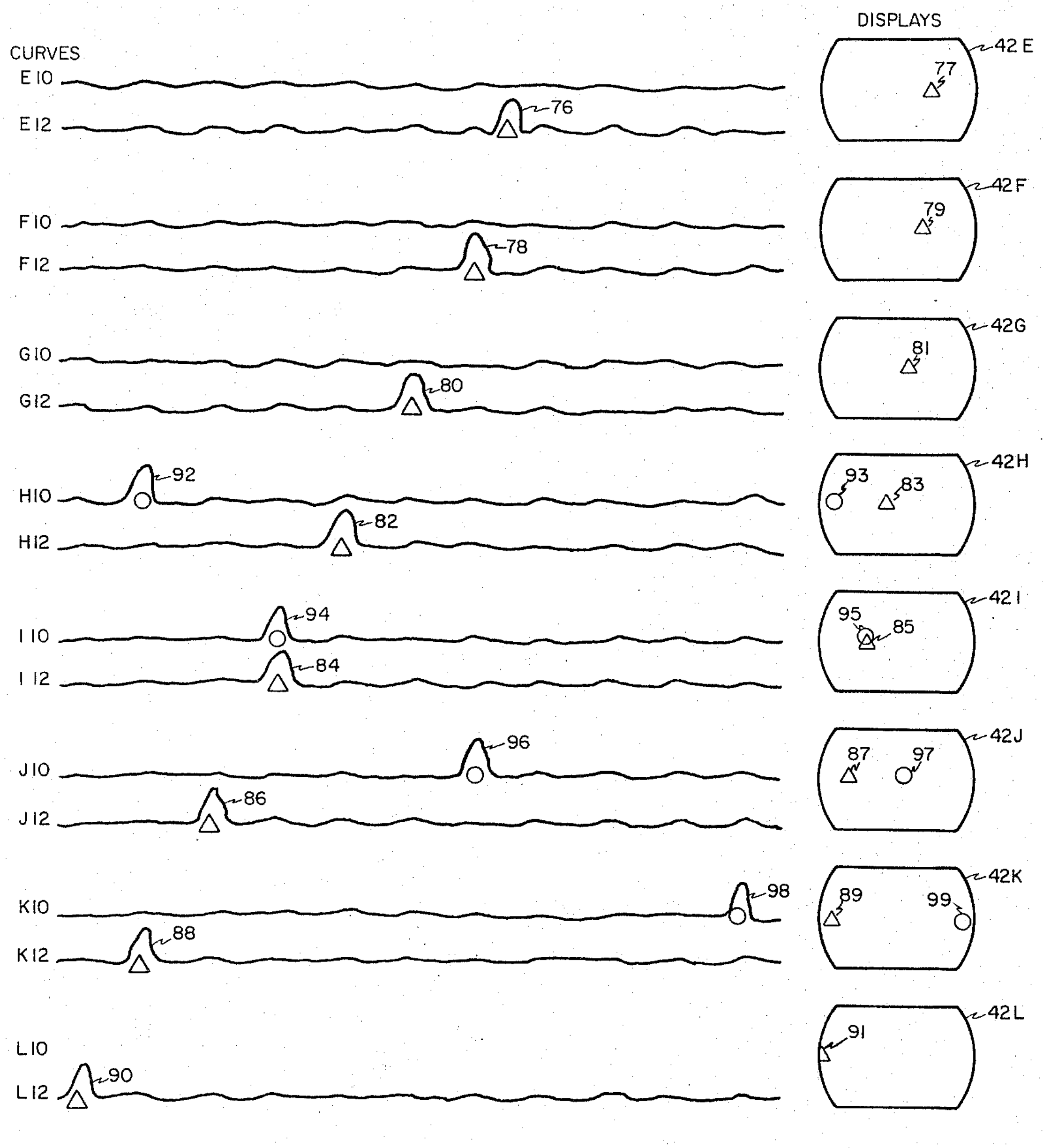
FIG. 4 is a set of curves used to explain the operation of the apparatus of FIG. 3.

FIG. 3 and the related curves of FIG. 4 are provided to show and aid in describing apparatus incorporating applicant's invention but wherein means other than a comparator-adder circuitry is employed to identify the location of the intrusion object in the space monitored. In FIG. 3 the general arrangement, as in FIG. 1, includes projectors 10 and 12 positioned for lines of observation, defined by the respective pairs of dotted lines 14 – 16 and 18 – 20, which intersect and monitor a three dimensional locale of interest including the zones indicated by the numerals 1, 2, and 3. Cameras 10 and 12 are connected to the monitor 42 by respective lines 28 and 44. A background scene, such as woods for example, are indicated generally at 22 and areas thereof in line of observation of respective cameras 10 and 12 are indicated by numerals 26 and 24. Arrow 78 indicates the path of travel of an intruder object, such as an enemy soldier emerging from the woods 22. Points E through L indicate spots at which the intruder is picked up by the cameras with the resulting electrical output signals per curves E through L for the respective cameras 10 and 12. Adjacent each pair of curves is shown the display which would be seen on the monitor 42 for each pair of output signals.

Considering FIG. 3 in conjunction with the sequential curves and displays of FIG. 4 one will better understand the advantages of the invention in its simplified form wherein the automatic feature of a comparator-adder analyzing circuit is eliminated. Thus, at point E (FIG. 3) the output signal curve E10 of camera 10 is simply zero or an ineffective low amplitude noise wave. This is because the object at point E is not in the line of observation of camera 10. It is in the view of camera 12, however, and at a point 77 about 65 percent from left to right across the screen of the monitor indicated at 42E and is shown as a pulse on curve E12 at a point 76 about 65 percent along the curve from left to right. In a similar manner at point F (FIG. 3) curves F10 and F12 (FIG. 4) are developed. At point F the pulse shows on curve F12 at 78 about 60 percent along the curve and no pulse is shown on curve F10. The monitor screen 42F opposite curves F10 and F12 show the spot F at the 60 percent across position indicated at 79. The spot generated by the output of camera 12 is thus gradually moving to the left across the face of the monitor 42 for G, H, I, J, K and L (FIG. 3). The spot continues to move to the left as shown at curve pulses 80, 82, 84, 86, 88, and 90 and as shown on the screens 42G through 42L at spots 81, 83, 85, 87, 89, and 91.

At the same time that the spots E through L (FIG. 3) are passing leftwardly across the line of observation defined by lines 18 – 20 they are also moving rightwardly across the line of observation defined by lines 14 – 16. Thus, looking at curves E10 through L10 the first output is at curve H10 at 92, followed by curve I10 at 94, J10 at 96 and K10 at 98, i.e. to the far right of the screen. Corresponding indications on the monitors 42H through 42K are indicated at spots 93, 95, 97 and 99.

The several advantages of the system should be apparent from the above. As the monitor 42 is observed the intruder object or individual is picked up at point E (FIG. 3) and the movements thereof are followed through point L if desired. However, at point I there is a correlation of positions. Both points 95 and 85, corresponding to pulses 94 and 84, are at the same position. There is an exact triangulation fix on the object at point I and at this point guns can be automatically or manually operated to destroy the object. The remaining points provide a sequential track of the object up to the point of coincidence of signal and thereafter should a kill not be made.

The object as seen by camera 10 can be distinguished on the screen from the object as seen by camera 12 by maintaining synchronism between the two cameras but placing them are half frame out of step. Another method of distinguishing between the two common outputs is to connect each to one element of a color television tube such that the spots of the two cameras are of different color on the screen except at coincidence when they will assume a third color.

What is claimed is:

1. In apparatus for detecting the intrusion of an object in a locale of interest, the improvement comprising:

a. two spaced apart TV cameras positioned for lines of observation which intersect and monitor a common empty three dimensional locale of interest having a mid-depth portion between adjacent monitored zones, b. a TV monitor having a display tube and connected to respond to output signals from said TV cameras upon the intrusion of said object, c. said TV cameras having means for synchronization with themselves and with said monitor to provide a coincidence of said object in time and location on the tube of said monitor when a mid-depth portion of said locale of interest is invaded by said object, and otherwise to show double images each approaching the other as said object approaches said mid-depth portion of said locale and double images moving farther apart as said object moves away from said mid-depth portion of said locale whereby said object can be accurately located for destruction.

2. Apparatus according to claim 1 a. the spacing of said TV cameras being adjusted in relation to the rate of TV scan and to the speed of said intrusion object to provide a locale of interest of sufficient depth such that the intrusion object will be traveling through the depth of said locale of interest long enough for said television cameras to scan the entire locale of interest thereby identifying said object while it is passing through said locale of interest.

3. Apparatus according to claim 1 including:

a. means for modifying the display of said object on said screen to distinguish between object displays derived respectively from said cameras to thereby aid in tracing the object movement to and through said monitored locale.

4. Apparatus according to claim 3 wherein:

a. said displayed object modifying means comprises the provision of separate color elements in said monitor tube such that said objects derived from said separate cameras will appear in different colors until the point of coincidence is attained and will then appear as a third color.

5. Apparatus according to claim 1 including:

a. comparator-adder analyzing circuitry connected to pass a composite signal from said cameras to said monitor only when the camera output signals are coincident in time to provide for displaying said object on said monitor in the time and position corresponding only to the entry of said object in said mid-depth portion of said locale of interest.

6. Apparatus according to claim 5, a. said comparator-adder analyzing circuitry comprising an AND gate for receiving said camera output signals and passing as an output said composite signal.

7. Apparatus according to claim 6, a. said analyzing circuitry also including amplifier means and diode means connected as clipper circuits for passing said camera output signals to eliminate the background noise and allow to pass only the stronger signal derived from an intrusion object.

8. Apparatus according to claim 6, a. said analyzing circuitry including pulse width adjuster means to develop two overlapping pulses and present to said AND gate the appearance of two pulses of identical time as may be desired by the depth of the monitored locale in relation to the scan rate of said cameras.

* * * * *